United States Patent Office 3,730,725
Patented May 1, 1973

3,730,725
ADDITIVE COLOR SCREEN ELEMENTS CONTAINING AN AZO CHROME-COMPLEXED DYE
Elbert M. Idelson, Newton Lower Falls, Mass., assignor to Polaroid Corporation, Cambridge, Mass.
No Drawing. Continuation-in-part of abandoned application Ser. No. 873,131, Oct. 31, 1969. This application Sept. 30, 1971, Ser. No. 185,403
Int. Cl. G03f 5/00, 7/04
U.S. Cl. 96—81                    12 Claims

ABSTRACT OF THE DISCLOSURE

Additive color screen elements are prepared using a mixed-azo chrome-complexed dye system to provide the red element, i.e., a combination of a phenylazo pyrazolone and a naphthylazo pyrazolone.

CROSS REFERENCE TO RELATED APPLICATION

This application is a continuation-in-part of application Ser. No. 873,131, filed Oct. 31, 1969 and now abandoned.

BACKGROUND OF THE INVENTION

This invention relates to photography and, more particularly, to additive color screens and processes for preparing same.

In general, color screen elements comprise a screen pattern formed of a plurality of light-transmitting colored elements which are each of an independent primary color and which are generally classifiable into different groups in accordance with the color of said elements. Thus, a conventional three-color additive screen generally has a set or group of red-colored filter elements, a set of blue-colored filter elements, and a set of green-colored filter elements. These filter elements are ordinarily in a mosaic or geometrical pattern in a random or predetermined distribution.

Color screen elements may be prepared by a variety of mechanical or photomechanical methods. A particularly suitable method of preparing color screen elements is disclosed and claimed in U.S. Pat. No. 3,284,208, issued Nov. 8, 1966 to Edwin H. Land. The aforementioned patent is directed to a process which comprises successively coating the smooth surface of a lenticular film with a plurality of photosensitive layers and sequentially subjecting the coatings to selectively displaced radiation incident on and focused by the indicated lenticules. Subsequent to each exposure, unexposed coating is removed and the remaining exposed area dyed with the appropriate dyes to provide the desired series of chromatic filter elements. U.S. Pat. No. 3,284,208 is incorporated herein by reference in its entirety.

However, a number of problems are involved in the selection of the dyes for use in the above-mentioned processes.

The primary consideration in the selection of the dye is, of course, the color produced thereby. Stability to light is also of prime importance to insure that the color will remain true substantially indefinitely since the color screen will be in position prior to use on the film and, of course, subsequent to exposure and processing of the film. The compatibility and dyeability of the dye with respect to the dyeable substrate must also be considered as well as the fastness or retention of the dye in a given substrate since diffusion, that is, the migration of the dye from one area into an adjacent area dyed with a different color dye would result in the lack of sufficient color accuracy and intensity with respect to the surface area dyed, accuracy of boundaries between dyed areas, by such a diffusion or mixing of the colors of adjacent areas.

The dye must also possess the property of resistance to photographic processing compositions, for example, alkaline processing compositions such as those set forth in U.S. Pat. No. 2,614,926. While the susceptibility to degradation by contact with processing compositions can be minimized to some degree by the employment of barrier coats of suitable polymeric materials, for example, between each adjacent colored filter element, such additional layers are not entirely desirable because of the possible loss of resolution in the resulting photographic image.

A novel red dye system has now been found for use in the preparation of additive color screen elements which is not susceptible to deficiencies of the prior art and which produces unexpected and superior properties in the additive color screen element.

SUMMARY OF THE INVENTION

Additive color screen elements of superior properties are prepared using a mixed-azo chrome-complexed dye system to provide the red element, specifically a phenyl azo pyrazolone and a naphthylazo pyrazolone.

DETAILED DESCRIPTION OF THE INVENTION

The novel additive screen element of the present invention employs a mixed-azo chrome-complexed dye represented by the formula:

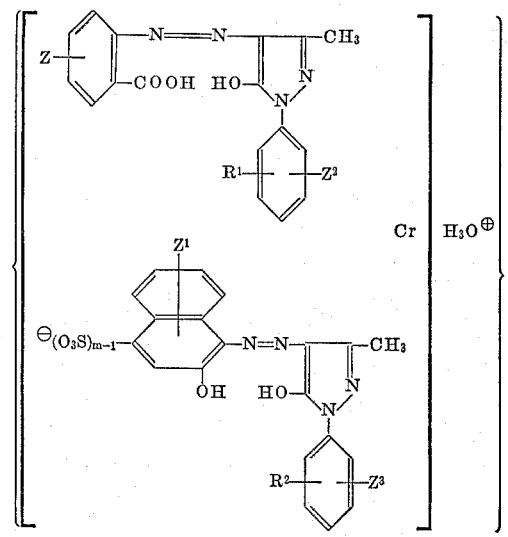

wherein $R^1$ and $R^2$ are hydrogen or groups imparting water solubility, such as sulfonyl or carboxyl groups, Z, $Z^1$, $Z^2$ and $Z^3$ are hydrogen or lower alkyl groups, preferably 1 to 5 carbon alkyl groups, and $m$ is an integer from 1 to 2.

Each component of the dye is preferably present in a 1:1 ratio.

Unlike prior art red azo dye systems, the novel dye system of the present invention has been found to possess an unusually high affinity for the dyeable stratum, particularly if the dyeable stratum is composed of gelatin. In addition, the dyed area does not redye, that is, in essence, a barrier is formed to other dyes which may be subsequently employed in preparing the multicolored additive color screen.

In the above-mentioned U.S. Pat. No. 3,284,208, additive multicolor screen elements particularly suited for use in additive multicolor photographic processes are prepared by successively coating on a smooth, flat surface of a lenticular film a plurality of photoresponsive layers. Each photoresponsive layer is subjected to exposure radiation incident to the lenticular film at angles adapted to provide exposed areas of the coating contiguous to each lenticule. The unexposed areas of the coating are then removed and the exposed areas dyed to provide a series of chromatic filter elements. The incident radiation employed to effect exposure of successive photo-responsive layers is directed so as to provide formation of each series of chromatic filter elements in substantial side-by-side relationship on the smooth surface of the lenticular film.

When the aforementioned exposed areas are contacted with a solution of the dye system of the present invention it has been found, by cross-sectional examination, that the exposed area swells to a height approximately 2–3 times its original height with a sharp sided configuration, that is, the side walls of the dyed material are substantially perpendicular to the supporting web or base and with a sharp delineation between the base of the dyed line and the base material. The presence of the steep side walls and the virtual absence of "tailing" results in an element exhibiting an unusually high degree of optical acuity. As indicated above, the dyeable material or matrix employed is preferably gelatin which provides the highest profile with the dye system of the present invention. The dyed area generally comprises as much as one-third, by weight, of dye.

Thus, by employing the dye system of the present invention, the dyed area possesses a greater degree of geometric quality than it did prior to dyeing and, a greater degree than can be achieved with other dyes.

Photosensitized gelatin, i.e., potassium, sodium or ammonium dichromate sensitized gelatin is the preferred dyeable material employed in the manufacture of the additive color screens of the present invention. Other suitable materials include photosensitized albumin, casein, gum arabic, polyvinyl alcohol, and other light-sensitive polymeric materials known to the art.

More specifically, the process for the production of additive multicolor photographic film units comprises coating a layer of lenticullar film having subcoated thereon an adhesive layer, such as a nitrocellulose lacquer layer, which in turn has overcoated thereon a selectively photoresponsive, preferably polymeric, layer, or matrix, such as an approximately 4 micron (dry weight) thick potassium, sodium or ammonium dichromate sensitized gelatin layer, which is exposed to radiation, preferably ultraviolet radiation, derived from a suitable exposure source.

The radiation is directed so as to impinge on the lenticules of the lenticular layer whereby the radiation traversing each lenticule is focused in a specific area of the photoresponsive layer immediately contiguous each lenticule receiving the radiation. For the preparation of trichromatic color screens, the area of exposure comprises approximately one-third of the photoresponsive area immediately contiguous each lenticule and, as a result thereof, approximately a one-third total area of the photoresponsive layer is subjected to exposure radiation.

Subsequent to photoexposure, the web is contacted with water or other suitable solvent for the unexposed photoresponsive layer, preferably within the range of about 80 to 140° F., for a time interval of about 3 to 60 seconds, to effect removal of unexposed portions of photoresponsive layer in accordance with the selected exposure pattern, and to provide thereby formation of a resist comprising the exposed areas.

The web now comprising exposed areas of matrix material is contacted with a dye solution comprising a dye substantive to the resist in order to provide the desired coloration thereto and, as a result, first formed optical filter elements. In addition to the dye, the dye solution may contain suitable wetting agents and/or dispersing agents, etc. Subsequent to forming the next colored optical filter element, the web may be contacted with cold water or other suitable solvent to remove any residual or excess dye. Optionally, the filter element is hardened by treatment with a hardener for the photoresponsive layer, e.g., in the case of gelatin, zirconyl sulfate.

The web is then dried and the thus-formed first optical filter element of the web is coated with an adhesive lacquer layer, if desired. Subsequent to substantial drying of lacquer coating, a second photoresponsive layer is then overcoated on the lacquer layer.

The above process is then repeated, with the radiation impinging on the lenticules at angles to provide at least a second and third area of exposed photoresponsive areas to which dyes are applied as described above to produce the desired multicolor screen element.

At any stage subsequent to the formation of the final series of optical filter elements, the lenticular surface of the polymeric lenticular film may be reconstituted as a continuous smooth surface, by application of a suitable solvent such as, for example, acetone, methyl cellosolve, acetic acid, methylene chloride, etc., whereby the deformation pressures created during manufacture of the lenticular film are released and the polymeric layer assumes its original continuous smooth surface. Exposure of the photoresponsive layer for the final series of lines will be masked by the preceding optical filter elements. Thus, while it may be used, it is not necessary that the lenticular layer be in position for the preparation of the final series of filter elements.

Removal of the lenticular conformation from the external surface of the film unit provides a bearing surface adapted for use in photographic apparatus employing additive multicolor film units, in addition to substantially simplifying the transmission of actinic energy through the film unit for photographic exposure and projection purposes. Where desired, the reconstituted surface may be polished, for example, by surface contact with an appropriate rotating polishing cylinder, for the time interval necessary to provide the desired optical characteristics to the web surface.

Optionally, the multicolor screen element may be overcoated with a protective polymeric composition such as nitrocellulose, cellulose acetate, etc., prior to the external surface thereof having a diffusion transfer print-receiving layer and/or panchromatically sensitized photographic emulsion applied thereto.

The character of the radiation beam incident on a lenticule, that is, the angles on contact, may be suitably controlled by the use of lenses; reflectors, louvers; radiation source size, type and position; and other techniques known to the art.

The line depth exposure of the photoresponsive layers may be accurately controlled by suitably varying the intensity and/or time of the incident radiation.

The novel dye system of the present invention is preferably contacted with the photoresponsive area in a suitable solvent solution, preferably an aqueous solution. The particular intensity of the dyed area may be selected by the employment of the dye concentration in the solution. Preferably, the concentration of the dye solution is about 1 to 15%, preferably about 6%. Preferably an acidic pH range is employed, more preferably, a pH range of from about 4 to 7. Dyeing is preferably carried out at temperatures of from about 60 to 150° F. In addition to the dye, the dye solution may contain suitable wetting agents and/or dispersing agents, thickeners and the like. Subsequent to each dye application the web may be contacted with cold water or other suitable solvent to remove any residual or excess dye. Preferably, the web is dried, as by the application of elevated temperatures prior to subsequent dyeing steps.

Because of the aforementioned steep-sided profile, the red filter element employing the dye system of the present invention is preferably employed as the first filter element applied to the substrate with the additional filter elements, e.g., blue and green, prepared subsequent to the red element. Thus, any effect of tailing or other undesirable property of the dyes is minimized by employing the present dye system initially, thus producing an additive color screen element with a more pronounced boundary between the various chromatic elements of the screen.

As described above, the dyeing of the polymeric material with the dye system of the present invention provides a barrier to other dyes to substantially prevent redyeing of the layer. It has been found that physical handling and transport of the red dyed layer may result in physical damage to the layer resulting in a phenomenon described as "scratch redyeing." This phenomenon results from a physical disturbance to the surface of the red dyed area which apparently renders the dyed material susceptible to redyeing by the subsequent dyeing operation employed in the preparation of the second colored filter element. The redyeing effect resulting from physical damage to the dyed area, however, can be substantially obviated by adding a chromium salt to the dye bath or as an after-treatment to the dyed gelatin. Suitable chromium salts include: chrome alum, the sulfate, chloride and the like. Preferably, chrome alum is employed. It is unexpected that the employment of chrome salts in the dye bath would provide the aforementioned resistance to physical damage to the dyeable material since the known hardening effects of chromium are not being utilized in the treatment. Analysis of the dye bath after the addition of the chrome salt fails to reveal the presence of the chromium ion; thus the mechanism employed is not known. Concentrations of chromium salts of from about 0.01% to 0.5% by weight, preferably 0.05%, are employed, which is much less than the concentration ordinarily used to harden gelatin.

In a particularly preferred embodiment the additive color screen element of the present invention employs a three-color system wherein the above-mentioned red dye system of the present invention is employed to provide the red line; the blue filter element is composed of a mixture of Direct Blue 86, Direct Blue 87 and Rhodamine B; and the green filter element is provided by a dye mixture composed of Acid Green 9, Acid Green 22 and Direct Yellow 4.

The mixed azo chrome-complexed dyes of the present invention are prepared by conventional methods, i.e., by the methods disclosed in U.S. Pat. No. 2,028,981.

For example, a 1:1 chrome complex of a 2-naphthol-1-azo pyrazolone is treated under alkaline conditions with a dye formed from an ortho aminobenzoic acid and a pyrazolone.

DESCRIPTION OF THE PREFERRED EMBODIMENTS

The present invention will be further illustrated and detailed in conjunction with the following illustrative construction which sets out representative embodiments and photographic utilization of the novel photographic film units of this invention, which, however, are not limited to the details therein set forth and are intended to be illustrative only.

A lenticular film may be first coated with an adhesive composition containing 70 cc. of methanol, 1.25 grams of nitrocellulose, and 30 cc. of butyl alcohol. A first layer of gelatin which had been sensitized by the addition of 15 weight percent potassium dichromate (based on dry gelatin), may be then coated on the external surface of the first adhesive layer. The first gelatin layer may be exposed to ultraviolet radiation, in accordance with the previously detailed explanation, and the resultant photoexposed carrier subjected to the described water wash steps to provide removal of unexposed sensitized gelatin, in accordance with the exposure pattern contained in the first gelatin layer. The web may be then treated with a bath comprising 6% of a dye of the formula:

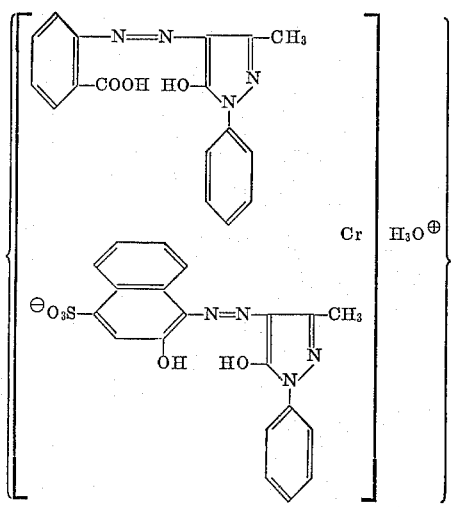

and 0.05% of chrome alum at a pH of 6.

The web may be then rinsed with water to effect removal of excess dye, contacted with a 5% solution of zirconium acid sulfate, rinsed with water and dried. A second layer of gelatin which had been sensitized by the addition of 15 weight percent potassium dichromate may be then coated on the second adhesive layer. The second photosensitized gelatin layer may be exposed to ultraviolet radiation in accordance with the previously detailed description. The second gelatin layer may be then washed with water to effect removal of unexposed photosensitive gelatin, in the manner previously detailed. The remaining gelatin resist may be dyed by contact with a first dyeing solution containing Direct Green 75 and a second solution containing Basic Yellow 21. The web may be then rinsed to effect removal of any residual excess dye, dried and coated with a third adhesive composition comprising 30 cc. butanol, 1.25 grams of nitrocellulose, and 70 cc. of methanol. A third layer of gelatin, sensitized with 15 weight percent potassium dichromate may be then coated on the external surface of the third adhesive layer. The third photosensitive gelatin layer may be subjected to exposure by ultraviolet radiation, in accordance with the description detailed previously. The third layer of photosensitive gelatin may then be washed in order to provide the desired resist formation. The resultant resist may be dyed by contact with a first solution containing Direct Blue 86 and Direct Blue 87 and a second solution of Rhodamine B. A protective overcoat layer may be then provided by coating the external surface of the multicolor screen element with a composition comprising 70 cc. methanol, 30 cc. butanol, and 5 grams of nitrocellulose. A diffusion transfer image-receiving layer comprising a silver-receptive stratum containing silver precipitating nuclei dispersed in a matrix of deactylated chitin may be then coated on the external surface of the protective layer, according to the practice described in U.S. Pat. No. 3,087,815, issued Apr. 30, 1963, to W. H. Ryan et al. The image-receiving layer may then be overcoated with a panchromatic silver iodobromide gelatin emulsion.

A cross-sectional examination of the thus-formed color screen element showed the red lines to possess steeper side walls than the other colored elements and to present a higher profile than the other elements or the gelatin resist prior to dyeing.

The thus formed additive multicolor diffusion transfer film unit may be then exposed to a predetermined subject and the latent image contained in the emulsion diffusion transfer processed, by contact thereof with a diffusion transfer processing composition, in accordance with the practice previously described. After an imbibition period of approximately 60 seconds the emulsion, together with the processing composition, may be stripped from contact with the image-receiving layer to uncover a positive transfer print formed in the image-receiving layer.

Projection of the resultant additive multicolor print showed satisfactory contrast, density and range.

Various colors and numbers of colors may be used in this invention but the basic system is a tri-color arrangement of the three primary colors, red, green and blue. A four-color system such as red, green, violet-blue and orange-yellow could be used also, by a sequential series of exposures effecting approximately one-fourth of the respective photoresponsive area providing formation of optical filter elements comprising a single selected color, followed by a fourth overall exposure, in accordance with the teachings of the instant disclosure. Furthermore, it will be recognized that, in accordance with the instant disclosure, a plurality of chromatic filter element series may be provided, the number of series being determined by the optical parameters of the lenticules comprising the selected lenticular film base employed. For example, a plurality of monochromatic filter elements may be provided by sequentially exposing and processing a plurality of sequentially deposited photoresponsive layers. The exposure medium comprising a sequence of respective exposures to preferably parallel radiation incident on the lenticular film at a series of angles is adapted to provide exposure areas in the respective photoresponsive layers to provide a plurality of adjacent monochromatic filter elements.

It is desirable of course that the adhesion of the carrier, the three monochromatic filter layers, etc., should be very secure so that the individual structures will remain bonded during the manufacture and processing of the finished product, and further that there will be subsequently no mechanical separation of the various layers which will create optical and mechanical difficulties.

Under these circumstances, it is desirable that adhesive or lacquer layers be interposed between respective layers and filter elements. The adhesive layer selected should be one which does not deleteriously interfere with the transparency of the final product, and yet provides sufficient adhesive capacity so as to allow vigorous treatment of the film unit during and subsequent to its production. The aforementioned nitrocellulose has been found to be a highly desirable bonding agent, although other adhesives known in the art for the instant purposes may be employed, where desired.

The bond obtained throughout the entire unit by this invention should be sufficient to withstand the vigorous treatment such as air blasting and heat to which the unit may be exposed. Moreover, there should be no local separation of the various layers during mechanical treatments that would cause spots, particularly on magnification.

Although for photographic purposes the panchromatic emulsion layer could be applied to the rear side of the carrier, for practical purposes it is necessary to coat the emulsion on the color screen side of the carrier to provide the high color saturation.

After exposure of this film, a latent image is formed in the emulsion layer and this may be processed in the same manner as black and white images are processed, without regard to the filter screen which is spaced between the carrier and the panchromatic emulsion, particularly where the filter screen is protected by a protective polymeric composition.

If a positive transparency film is desired, the image may be reversed in the conventional manner or the positive transparency film may be provided by the aforementioned diffusion transfer photographic processes.

In the description herein, each color series of filter elements has been described as covering that part of the total area in proportion to the total number of colors used, i.e., in the tri-color system, each color occupies one-third of the total area. This may vary quite widely before having a noticeable effect to the observer and, in fact, may be compensated by changing the intensity of the colors. In actual practice, if one dye is of greater intensity than the others, a deliberate compensation may be made by reducing the total relative area of the intense color. The aspect of relative areas is well known in the art so that when relative areas are used in this application, it is intended to include the variances which the art would recognize as being successful.

Lenticular films employed have comprised 320, 550 and 635 lenticules per inch and may be prepared by any of the conventional procedures well known for production of such films. The focal length of the light modulating lenticules employed is generally in the order of about $100\mu$ in air and, as a result of this short focal length, any object over about one inch from the lens surface is at infinity. As a consequence of this, maintenance of the exposure source in focus is simplified.

Specifically, a suitable polymeric film base web may be continuously contacted with a rotating embossing roller under appropriate conditions of temperature, pressure and/or solvents to provide lenticules of the shape and size desired.

Since certain changes may be made in the above processes and products without departing from the scope of the invention herein involved, it is intended that all matter contained in the above description shall be interpreted as illustrative and not in a limiting sense.

What is claimed is:

1. A photographic multicolor screen element which comprises, in combination, a transparent support carrying on one surface a geometrically repetitive plurality of chromatic filter element series, one of said chromatic filter element series comprising filter elements including a dye represented by the formula:

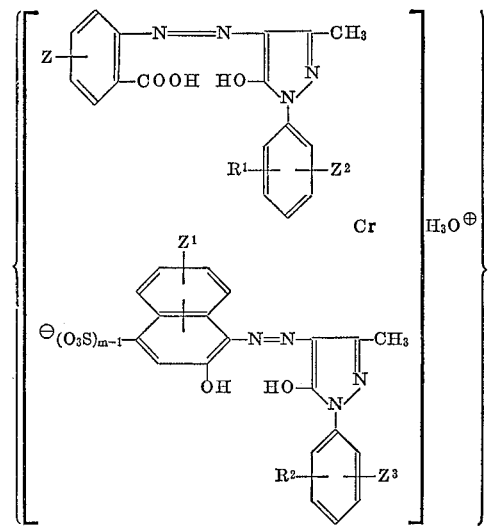

wherein $R^1$ and $R^2$ are selected from the group consisting of hydrogen and groups imparting water solubility, and Z, $Z^1$, $Z^2$ and $Z^3$ are each selected from the group consisting of hydrogen and 1 to 5 carbon alkyl groups and $m$ is an integer from 1 to 2.

2. A product as defined in claim 1 wherein said chromatic filter element series are in substantially side-by-side relationship.

3. A product as defined in claim 1 wherein one of said filter elements comprises a polymeric matrix dyed by said dye.

4. The product as defined in claim 1 wherein said filter elements are composed of gelatin.

5. A photographic product as defined in claim 1 including a panchromatic photographic emulsion layer on the surface of said chromatic filter elements opposite said support.

6. A product as defined in claim 1 including a photographic diffusion transfer image-receiving layer on the surface of said chromatic filter elements opposite said support.

7. A product as defined in claim 6 including a panchromatic photographic emulsion layer on the external surface of said diffusion transfer image-receiving layer.

8. A product as defined in claim 1 wherein said dye is:

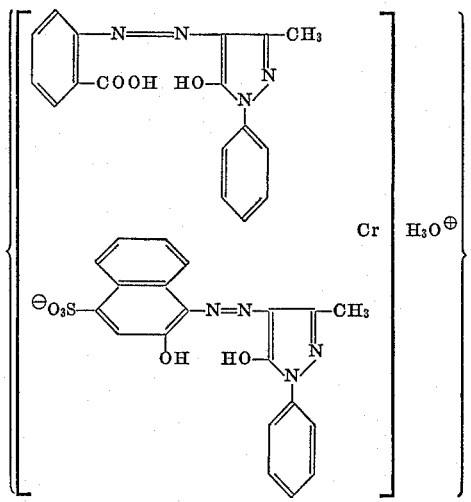

9. A photographic trichromatic additive color screen element which comprises a flexible, transparent support carrying on one surface a geometrically repetitive plurality of monochromatic filter elements comprising red, green and blue filter elements, said red filter elements containing a dye of the formula:

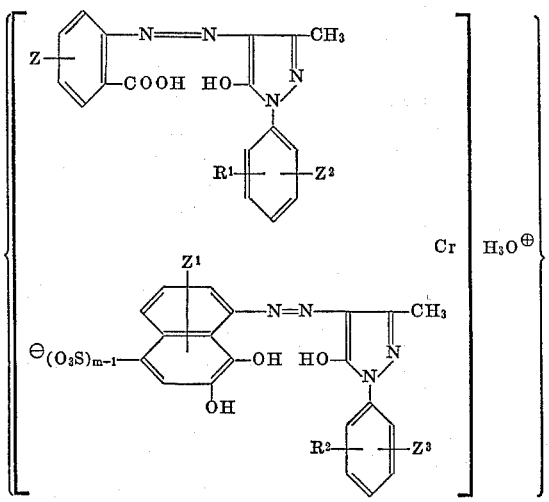

wherein $R^1$ and $R^2$ are selected from the group consisting of hydrogen and groups imparting water solubility, Z, $Z^1$, $Z^2$ and $Z^3$ are each selected from the group consisting of hydrogen and 1 to 5 carbon alkyl groups, and $m$ is an integer from 1 to 2.

10. A photographic multicolor screen element as defined in claim 9 including an adhesive interposed between contiguous surfaces of said filter elements.

11. A product as defined in claim 9 wherein said blue filter element is provided by a dye comprising Direct Blue 86, Direct Blue 87 and Rhodamine B and said green filter element is provided by a dye comprising Direct Green 75 and Basic Yellow 21.

12. A product as defined in claim 9 wherein said red filter elements contain a dye of the formula:

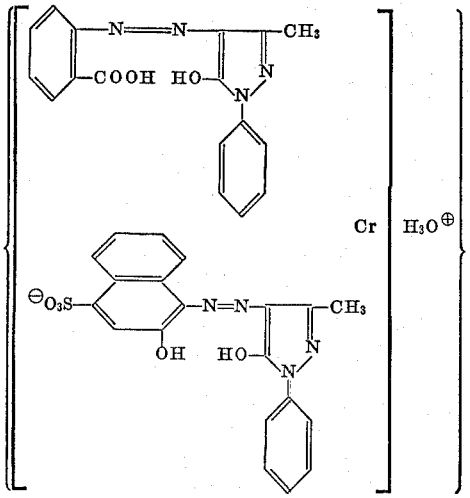

References Cited
UNITED STATES PATENTS

| | | | |
|---|---|---|---|
| 3,284,208 | 11/1966 | Land | 96—25 X |
| 3,455,633 | 7/1969 | Land | 96—26 X |
| 3,519,423 | 7/1970 | Sharp | 96—118 X |

J. TRAVIS BROWN, Primary Examiner

A. T. SURO PICO, Assistant Examiner

U.S. Cl. X.R.

96—26, 118